United States Patent [19]

Smart et al.

[11] Patent Number: 5,450,150
[45] Date of Patent: Sep. 12, 1995

[54] LIGHT-SHIELDING DOOR OF FILM CASSETTE HAS NOTCHES THAT MATE WITH FILM SUPPORT RAILS OF CAMERA

[75] Inventors: David C. Smart, Rochester; Dennis R. Zander, Penfield, both of N.Y.

[73] Assignee: Eastman Kodak Company, Rochester, N.Y.

[21] Appl. No.: 188,260

[22] Filed: Jan. 28, 1994

[51] Int. Cl.[6] .......................................... G03B 17/00
[52] U.S. Cl. .............................. 354/203; 354/275
[58] Field of Search ............. 354/203, 275, 276, 277

[56] References Cited

U.S. PATENT DOCUMENTS

| | | | |
|---|---|---|---|
| 4,685,790 | 8/1987 | Uematsu | 354/203 |
| 5,200,777 | 4/1993 | Zander | 354/275 |
| 5,296,887 | 3/1994 | Zander | 354/275 |

*Primary Examiner*—Howard B. Blankenship
*Attorney, Agent, or Firm*—Roger A. Fields

[57] ABSTRACT

A light-shielding door of a film cassette has a pair of notches or indentations that mate with film support rails of a camera to facilitate movement of a leading end of a filmstrip from the film cassette onto the film support rails when the light-shielding door is open.

3 Claims, 6 Drawing Sheets

LIGHT-SHIELDING DOOR OF FILM CASSETTE HAS NOTCHES THAT MATE WITH FILM SUPPORT RAILS OF CAMERA

CROSS-REFERENCE TO RELATED APPLICATION

Reference is made to commonly assigned, application Ser. No. 08/066,686 entitled FILM CASSETTE WITH FILM EXPOSURE-STATUS INDICATOR DEVICE and filed May 20, 1993 in the name of Dennis R. Zander, now abandoned.

BACKGROUND OF THE INVENTION

1. Field of the Invention

The invention relates generally to the field of photography, and in particular to film cassettes and cameras. More specifically, the invention relates to a light-shielding door of a film cassette having notches or indentations that mate with film rails of a camera or other apparatus to facilitate movement of a leading end of a filmstrip from the film cassette onto the film support rails when the light-shielding door is open.

2. Description of the Invention

Commonly assigned U.S. Pat. No. 5,200,777, issued Apr. 6, 1993, discloses a film cassette capable of thrusting or propelling a leading end of a filmstrip out of the cassette interior responsive to unwinding rotation of a film spool about which the filmstrip is coiled. A light-shielding door of the film cassette is closed to prevent ambient light from entering the cassette interior through a film egress/ingress slot and is opened to permit film movement out of and into the cassette interior.

Problem to be Solved by the Invention

If the film cassette disclosed in prior art U.S. Pat. No. 5,200,777 is intended to be used with a camera or other apparatus of the type which has a pair of film support rails for guiding the filmstrip across a back frame opening or a film gate, for example, some difficulty may be encountered in advancing the leading end of the filmstrip over the open door and onto the film support rails. Consequently, the filmstrip may not reach its intended destination.

The Cross-referenced Application

The cross-referenced application discloses a film cassette which has a light-shielding door including a pair of spaced notches or indentations.

SUMMARY OF THE INVENTION

According to one aspect of the invention, a film cassette intended to be used with a camera or other apparatus of the type which has a pair of film support rails, comprises a cassette interior for storing a filmstrip, a film egress/ingress slot for permitting film movement out of and into the cassette interior, and a light-shielding door closed to prevent ambient light from entering the cassette interior through the film egress/ingress slot and opened to permit film movement out of and into the cassette interior, and is characterized in that:

the light-shielding door has a pair of indented portions spaced apart from one another to form respective recessed areas for receiving the film support rails when the light-shielding door is open, to facilitate movement of a leading end of the filmstrip onto the film support rails.

According to another aspect of the invention, a pair of film support rails intended to be used with a film cassette of the type which has a light-shielding door including a pair of spaced notches that are exposed when the light-shielding door is open, is characterized in that:

the film support rails have respective forward tapered ends located to be received in the notches when the light-shielding door is open, to facilitate movement of a leading end of a filmstrip from the film cassette onto the film support rails.

DETAILED DESCRIPTION OF THE PREFERRED EMBODIMENT

The invention is disclosed as being embodied preferably in a film cassette and a camera. Because the features of a film cassette and a camera are generally known, the description which follows is directed in particular to elements forming part of or cooperating directly with the disclosed embodiment. It is to be understood, however, that other elements not specifically shown or described may take various forms known to persons of ordinary skill in the art.

Figure 1:
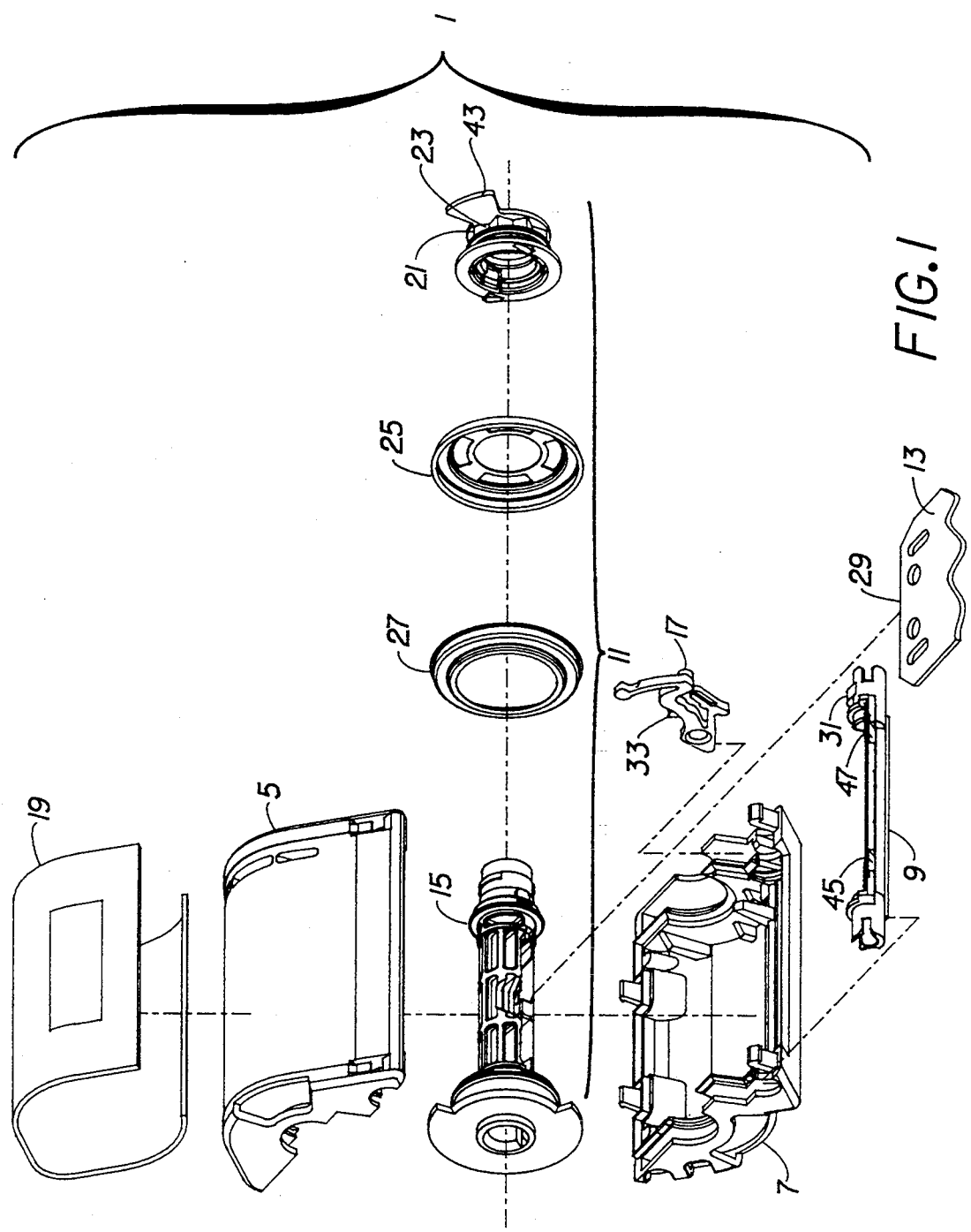
FIG. 1 is an exploded perspective view of a film cassette in accordance with a preferred embodiment of the invention.
Figure 3:
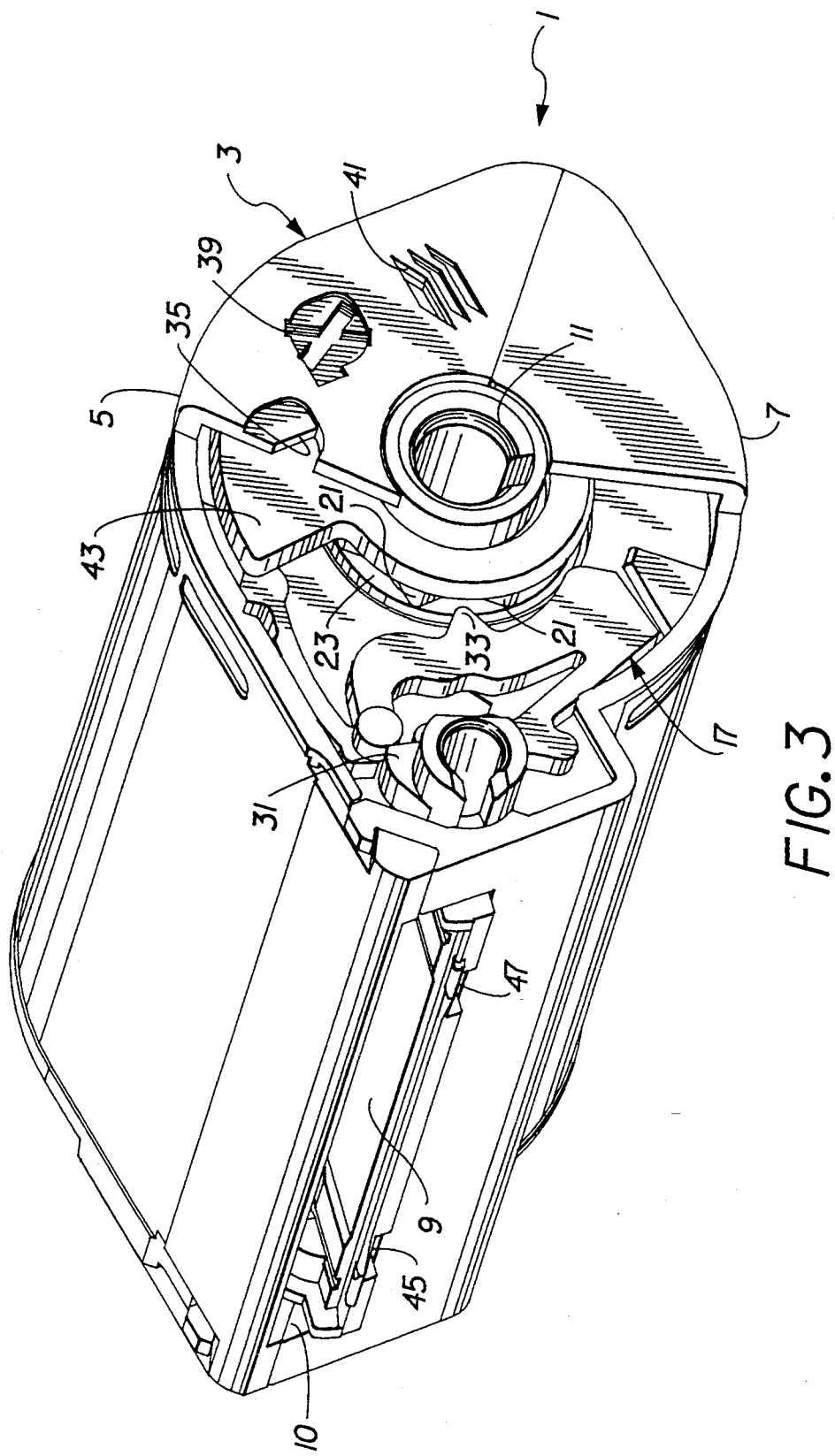
FIG. 3 is an assembled perspective view of the film cassette depicted with part of the cassette shell cut away to illustrate a spool lock and shown with the light-shielding door open.

Referring now to the drawings, FIG. 1 is an exploded perspective view of a film cassette 1 in accordance with a preferred embodiment of the invention, and FIG. 3 is an assembled perspective view of the film cassette depicted partly cut away to show certain details of its interior. Generally, the film cassette 1 comprises a cassette shell 3 made up of two mating shell halves 5 and 7, a light-shielding door 9, closed to prevent ambient light from entering the cassette interior through a film egress/ingress slot 10 located between the two shell halves and opened to permit film movement into and out of the cassette interior via the film egress/ingress slot, a film spool 11 supported for rotation inside the cassette shell in opposite film unwinding and film winding directions to unwind a filmstrip 13 off the spool core 15 and to wind the filmstrip onto the spool core as in commonly assigned U.S. Pat. No. 5,234,174, issued Aug. 10, 1993, a spool lock 17 for engaging the spool core to prevent rotation of the film spool and out of engagement to release the film spool, and a cassette covering label 19.

Figure 5:
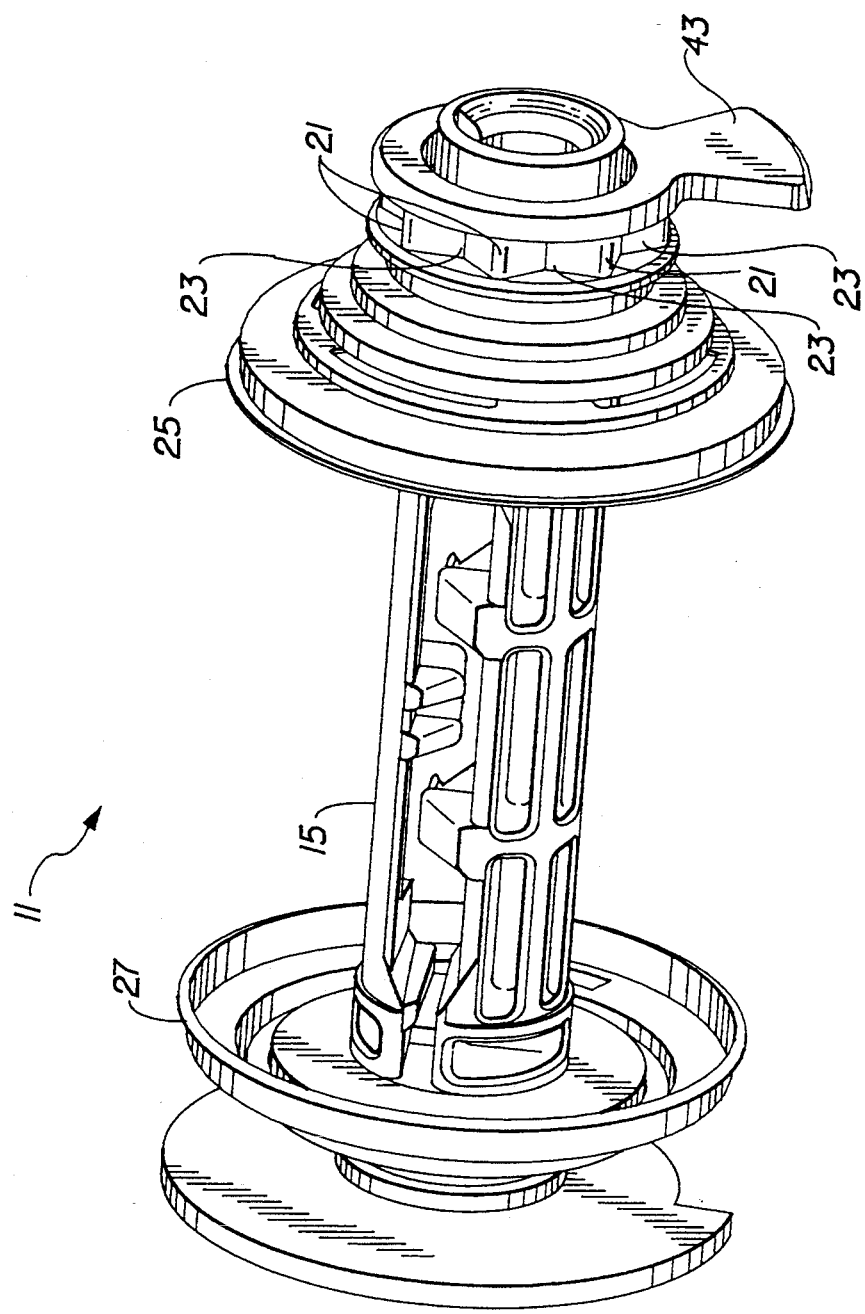
FIG. 5 is a perspective view of a film spool which is rotatably supported inside the cassette shell.

The spool core 15 as shown in FIGS. 1, 3, and 5 has a toothed periphery consisting of successive symmetrical teeth 21 separated by interdental spaces 23, and it supports a pair of coaxial flanged disks 25 and 27 between which the filmstrip 13 is stored in roll form. A trailing or inner end 29 of the filmstrip 13 is attached to the spool core 15.

The light-shielding door 9 as shown in FIGS. 1 and 3 includes integral cam means 31 for pivoting the spool lock 17 to a locking position as the door is closed. When the spool lock 17 is in its locking position, not shown, an integral detent 33 of the spool lock is located in anyone of the interdental spaces 23 between two adjacent teeth 21 of the spool core 17 to secure the film spool 11 in anyone of a number of rotational orientations equal to the number of interdental spaces. If the light-shielding door 9 is opened as shown in FIG. 3, its cam means 31 is retracted from the spool lock 17. As a result, forcible rotation of the film spool 11 in the film winding or film unwinding direction will cause one of the two adjacent teeth 21 between which the detent 33 is located to eject the detent from the interdental space 23 separating those two teeth. Thus, the spool lock 17 will be pivoted out of its locking position.

Figure 2:
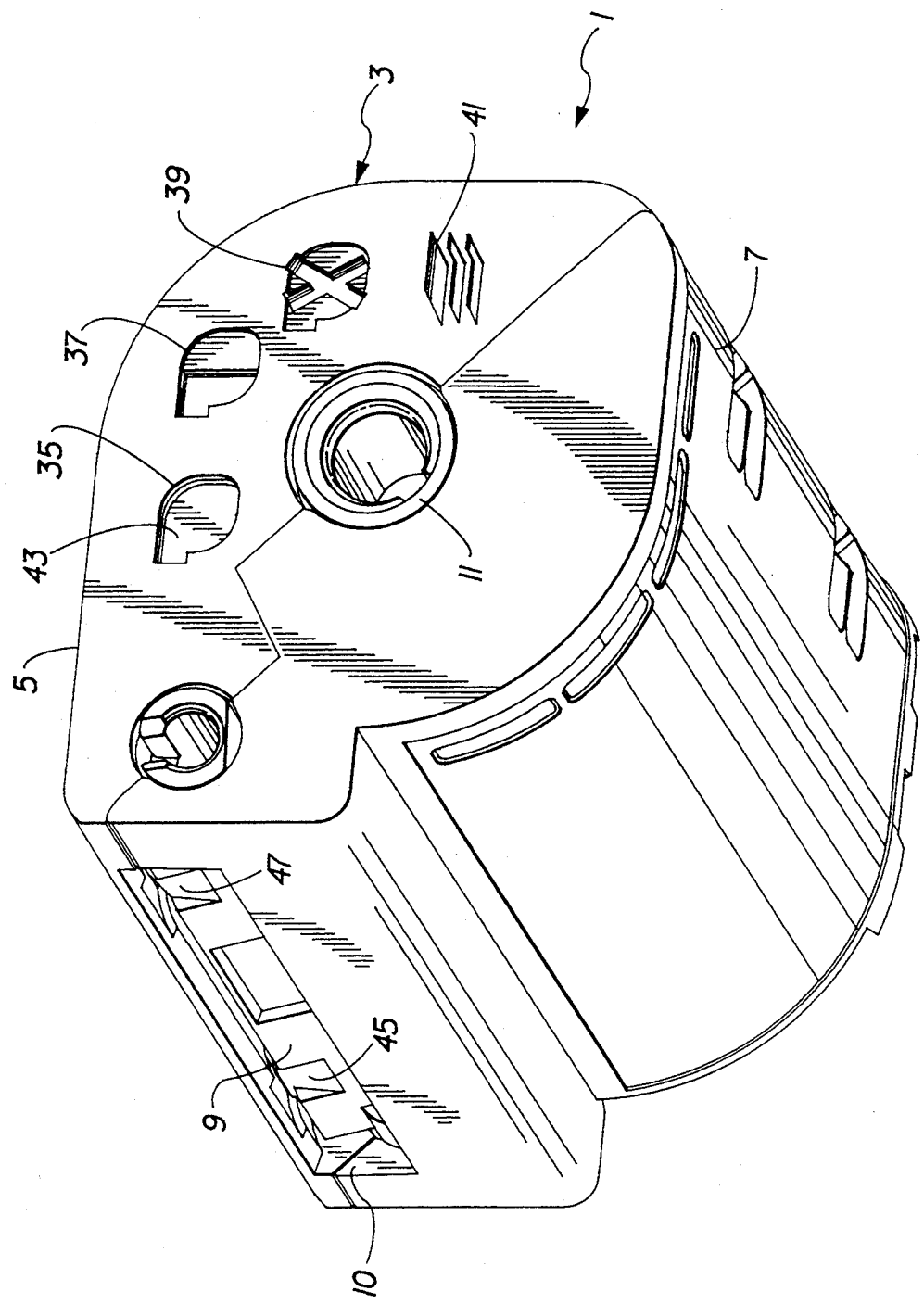
FIG. 2 is an assembled perspective view of the film cassette, shown with a light-shielding door of the film cassette closed.
Figure 4:
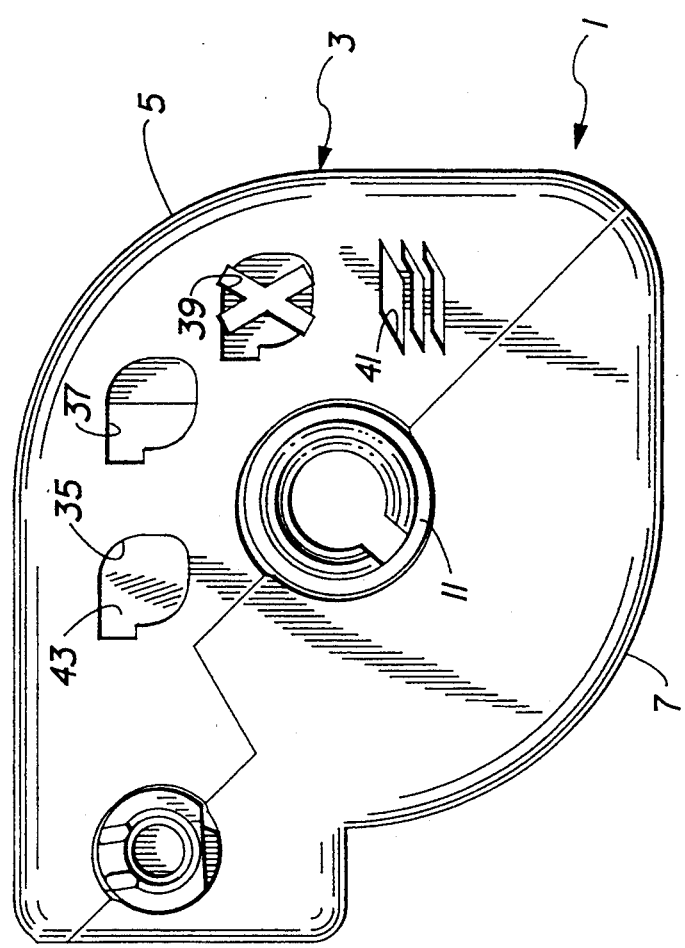
FIG. 4 is an end view of the film cassette depicting several film exposure-status icons.

The shell half 5 at one of its ends has four different icons in the form of respective cut-outs 35, 37, 39, and 41 shown in FIGS. 2 and 4. The icon cut-out 35 is uniquely shaped to effect an indication that the filmstrip 13 is fresh or unexposed. The icon cut-out 37 is uniquely shaped to effect an indication that the filmstrip 13 is partly exposed (and partly unexposed). The icon cut-out 39 is uniquely shaped to effect an indication that the filmstrip 13 is fully exposed. The icon cut-out 41 is uniquely shaped to effect an indication that the filmstrip 13 has been processed in a film processing machine to develop the latent images on the exposed film.

An indicator flag 43, which preferably is a different color than the cassette shell 3, is coaxially fixed to the spool core 15 as shown in FIGS. 1 and 5, to be rotated with the film spool 11 in the film unwinding and film winding directions. Initially, the flag 43 is secured with the film spool 11 in a rotational orientation that locates the flag immediately beneath the cut-out 35 as shown in FIGS. 2 and 4, to be visible to provide an indication that the filmstrip 13 is fresh or unexposed. Conversely, when the flag 43 is secured with the film spool 11 in a rotational orientation that locates the flag immediately beneath the cut-out 37, it is visible to provide an indication that the filmstrip 13 is partly exposed (and partly unexposed). When the flag 43 is secured with the film spool 11 in a rotational orientation that locates the flag immediately beneath the cut-out 39, it is visible to provide an indication that the filmstrip 13 is fully exposed. When the flag 43 is secured with the film spool 11 in a rotational orientation that locates the flag immediately beneath the cut-out 41, it is visible to provide an indication that the filmstrip 13 has been processed to develop latent images on the filmstrip.

Figure 6:
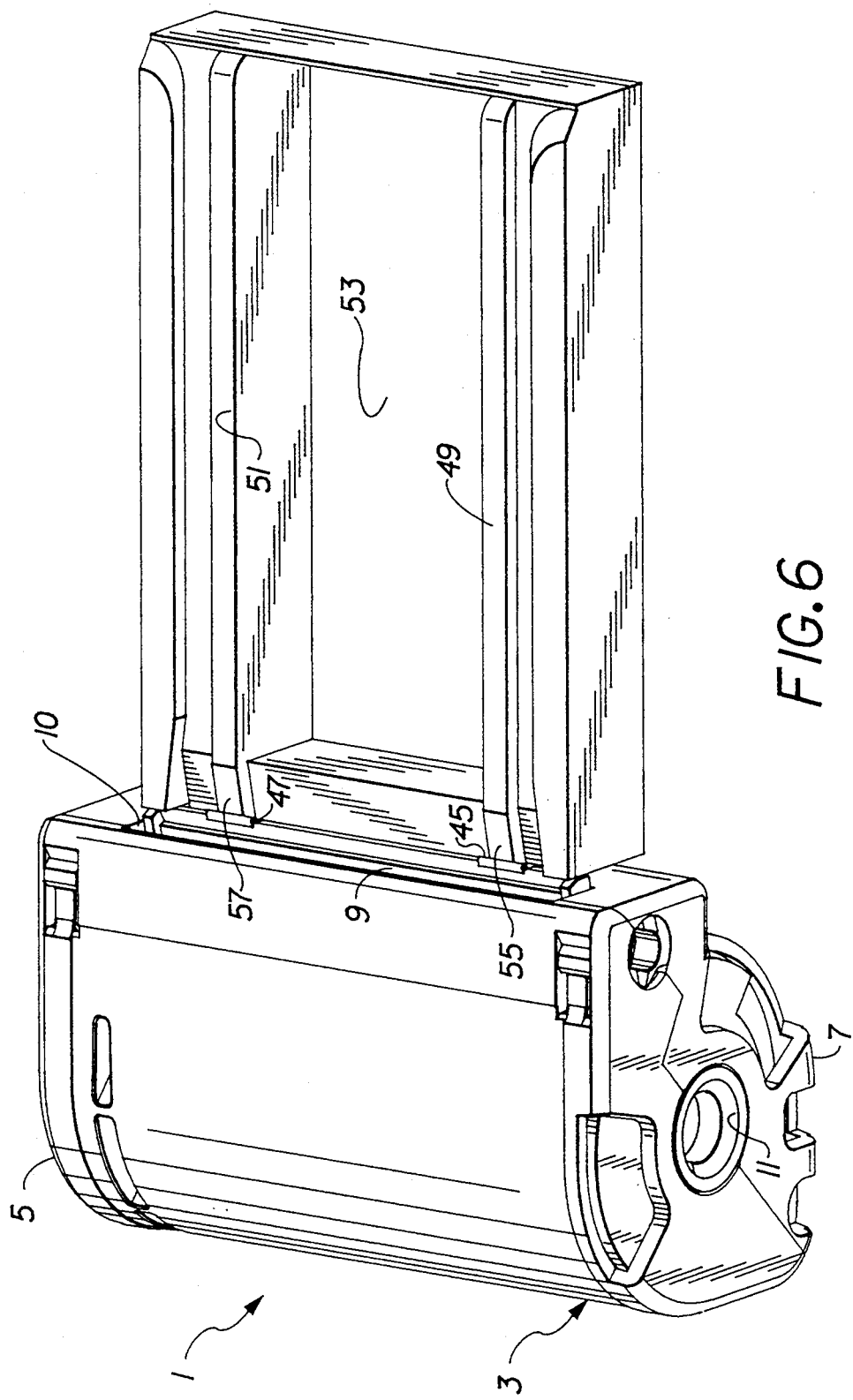
FIG. 6 is a perspective view of the film cassette and a pair of film supporting rails of a camera or other apparatus, showing notches in the open door mating with tapered forward ends of the film support rails.

According to the invention as shown in FIGS. 1–3 and 6, the light-shielding door 9 has a pair of spaced indented portions 45 and 47 that form notches or recessed areas. A pair of parallel film supporting rails 49 and 51 for guiding the filmstrip 13 across a back frame opening 53 or film gate in a camera, for example, have tapered forward ends 55 and 57. The indented portions 45 and 47 and the tapered forward ends 55 and 57 are shaped and located to mate as shown in FIG. 6, to facilitate movement of a leading end of the filmstrip 13 over the open door 9 onto the film support rails 49 and 51.

The invention has been described with reference to a preferred embodiment. However, it will be appreciated that variations and modifications can be effected by persons of ordinary skill in the art without departing from the scope of the invention.

Parts List For FIGS. 1-5

1. film cassette
3. cassette shell
5 & 7. shell halves
9. light-shielding door
10. film egress/ingress slot
11. film spool
13. filmstrip
15. spool core
17. spool lock
19. covering label
21. spool teeth
23. interdental spaces
25 & 27. spool disks
29. trailing film end
31. camming means of door
33. detent of spool lock
35, 37, 39, & 41. four icon cut-outs
43. indicator flag
45 & 47. indented portions of light-shielding door 13
49 & 51. film support rails
53. back frame opening or film gate
55 & 57. tapered forward ends of film support rails

We claim:

1. A film cassette intended to be used with apparatus which has a pair of film support rails, comprises a cassette interior for storing a filmstrip, a film egress/ingress slot for permitting film movement out of and into said cassette interior, and a light-shielding door closed to prevent ambient light from entering said cassette interior through said film egress/ingress slot and opened to permit film movement out of and into the cassette interior, and is characterized in that:

said light-shielding door has a pair of indented portions spaced apart from one another to form respective recessed areas for receiving the film support rails when the light-shielding door is open, to facilitate movement of a leading end of the filmstrip onto the film support rails.

2. A film cassette as recited in claim 1, wherein said recessed areas are located on an exterior of said light-shielding door when the light-shielding door is closed and is located on an underside of the light-shielding door when the light-shielding door is open.

3. A combination of apparatus which has a pair of film support rails and a film cassette intended to be used with said film support rails comprising a cassette interior for storing a filmstrip, a film egress/ingress slot for permitting film movement out of and into said cassette interior, and a light-shielding door closed to prevent ambient light from entering said cassette interior through said film egress/ingress slot and opened to permit film movement out of and into the cassette interior, characterized in that:

said film support rails have respective forward tapered ends; and said light-shielding door has a pair of indented portions spaced apart from one another to form respective recessed areas for receiving said forward tapered ends when the light-shielding door is open, to facilitate movement of a leading end of the filmstrip onto said film support rails.

* * * * *